United States Patent [19]
Hohenester et al.

[11] Patent Number: 4,504,515
[45] Date of Patent: Mar. 12, 1985

[54] PROCESS FOR PREPARING LOW-FAT MEAT PRODUCTS AND IN PARTICULAR SAUSAGES WITH HIGH PROTEIN CONTENT

[76] Inventors: Hermann Hohenester, Strass 21, Burgkirchen; Wolfgang Hohenester, Braugasse 25, 8260 Mühldorf, both of Fed. Rep. of Germany

[21] Appl. No.: 484,006

[22] Filed: Apr. 14, 1983

Related U.S. Application Data

[63] Continuation of Ser. No. 220,402, Dec. 29, 1980, abandoned, which is a continuation of Ser. No. 71,446, Aug. 31, 1979, abandoned, which is a continuation of Ser. No. 859,503, Dec. 9, 1977, abandoned, which is a continuation of Ser. No. 675,033, Apr. 4, 1976, abandoned, which is a continuation of Ser. No. 582,023, May 29, 1975, abandoned, which is a continuation-in-part of Ser. No. 478,545, Jun. 11, 1974, abandoned, which is a continuation of Ser. No. 298,973, Oct. 19, 1972, abandoned.

[30] Foreign Application Priority Data

Oct. 22, 1971 [DE] Fed. Rep. of Germany ....... 2203582

Jan. 26, 1972 [DE] Fed. Rep. of Germany ....... 2152655

[51] Int. Cl.$^3$ .............................................. A22C 11/00
[52] U.S. Cl. .................................... 426/641; 426/646; 426/657
[58] Field of Search ............... 426/646, 647, 656, 657, 426/512, 513, 332, 587, 630, 298, 973, 478, 545, 582, 23, 675, 33, 859, 503, 71, 446, 220, 402

[56] References Cited

U.S. PATENT DOCUMENTS 2,355,548 8/1944 Musher .............................. 426/646

OTHER PUBLICATIONS

Webb, "Byproducts from Milk," Avi Publishing Co., (1970), pp. 87, 95 and 347–348.

*Primary Examiner*—R. B. Penland

[57] ABSTRACT

This invention relates to a process of preparing low-fat meat products and in particular sausages with high protein content employing skimmed milk or whole milk to produce the desired low-calorie product.

2 Claims, No Drawings

PROCESS FOR PREPARING LOW-FAT MEAT PRODUCTS AND IN PARTICULAR SAUSAGES WITH HIGH PROTEIN CONTENT

This is a continuation of co-pending application Ser. No. 220,402 filed Dec. 29, 1980 abandoned which is a continuation of application Ser. No. 071,446 (now abandoned) filed Aug. 31, 1979 which is in turn a continuation of application Ser. No. 859,503 filed on Dec. 9, 1977 (now abandoned) which is itself a continuation of application Ser. No. 675,033 filed on Apr. 4, 1976 (now abandoned) which is in turn a continuation of prior application Ser. No. 582,023 filed May 29, 1975 (now abandoned) which is a continuation-in-part of application Ser. No. 478,545 (now abandoned) filed on June 11, 1974 which is itself a continuation of application Ser. No. 298,973 (now abandoned) filed on Oct. 19, 1972.

This invention relates to a process of preparing low-fat meat products and in particular sausages with high protein content that are particularly advantageous from the point of view of physiological nourishment and do not require the addition of bacon, fat or emulsifiers such as hydrolyzed or disintegrated milk proteins. The process according to the invention is especially suitable for preparing low-calorie dietetic sausage products.

In the traditional production of boiled sausage (meat sausage), beef, for example, is generally first comminuted in a mincing machine and finely comminuted in a cutter with salt or nitrite pickling salt and ice to form the so-called basic emulsion. Here muscle flesh is comminuted, while adding water or ice and salt. It is most important to dissolve as much as possible of the myosia contained in the membranous sheaths of the muscle, said myosia being partly in suspended and partly is dissolved form, and undergoing a cohesive coagulation upon heating. There is thus obtained the agglutination and resistance to cutting of the finished product.

In such traditional production the following operations are performed separately. First, a mechanical comminuation of the meat begins in the mincing machine and continues in the cutter. The membranous sheat of the muscle is thereby opened. This alone would not suffice to dissolve the myosia as it is also necessary to add a solvent in the form of cooled water or ice. Bacon is then pre-comminuted in the mincing machine and the fine comminution takes place in the cutter while admixing the basic meat emulsion until a complete emulsification of this mixture is obtained. The fat is admixed by the frictional action of the cutter blade and the final product is a fat-water-protein emulsion in which the dissolved protein assumes the part of the emulsifier and stabilizer. Nitrite pickling salt, condiments, seasonings, spices and reddening substances are added during the blending. The mixture is then stuffed into a skin casing, hot smoked and scalded for the purpose of heat coagulation.

In the conventional production of cooked liver sausages, for example liver is pre-comminuted with nitrite pickling salt and onions. Brains and offals are finely cut with cooking broth and the previously cut liver is admixed, adding seasoning for liver sausage and glutamate. The composition thus produced is stuffed into skin casings boiled and then cold smoked. The solidification is obtained by means of fat or of heat coagulation of liver or blood, since a reticulation of the separate meat fibers is not possible mostly because of the high fat content.

Sausages thus produced, however, have a high fat content and a high total value of calories. Therefore such sausages are undesirable for people needing a low calorie and low fat diet, yet one that is rich in protein.

It should be pointed out that the main problem in the production of sausages is the water absorption of muscle flesh and the emulsification of fat in the basic emulsion. Together with the main components of fat and water, an emulsifier was indispensable to producing a heat-stable emulsion. It was necessary that an emulsifier assumes the emulsification of the fat and thereby release the meat protein fractions to provide for the water absorption and structure formation. Adjuvants can provide such emulsifiers, however, their addition to meat sausages is subject to strict food law requirements, even if said adjuvants are physiologically harmless and microbiologically perfect, simplify and improve the processing and stability and show no undesirable reactions with other ingredients or packing materials.

In accordance with this invention this problem is solved by utilizing whole milk or skinned milk as essential compound for producing a low-fat high protein content meat product and especially sausages without being necessary to add bacon, fat or any emulsifier as par example a disintegrated milkderivatine or milk powder. The process is suitable for producing foods of different kinds that are low in calories and dietetically advantageous, as the fat content of the products is reduced to a minimum. High quality meat products and particularly sausages are obtained of excellent consistency, flavor and appearance by working only with milk and with lean meat of good quality. According to the invention it is essential that beside the lean meet there is used whole milk or skimmed milk having both genuine properties of natural milk containing high nourishing proteins and a very pleasant taste and flavour. Lean meat has good agglutination properties and a low content of connective tissue.

More specifically there is taught herein a process for preparing low-fat meat dishes comprising pre-comminuting major quantities of lean meat selected from the group consisting of beef, veal, pork and hare, then thoroughly admixing with minor quantities of skimmed milk or whole milk in the presence of less than 5% by weight of seasonings and/or preservatives and then preparing for consumption.

As milk is used a skinned or a whole milk.

Seasonings and/or preservatives employed can be nitrite pickling salt (nitrite content does not exceed 200 parts/million in the product after curing and processing), table salt (NaCl), phosphate glutamate, parsley, onions, pistachio nuts.

The comminuted and homogenized mass can then be placed into an appropriate container, such as a can or a sausage casing made of animal or artifical membrane. Such container is then heated to a temperature of 65° C.–100° C. for a period of at least 20 minuted. This heating can be by boiling or frying. If required there is also performed a conventional smoking.

Occasionally proteins can also be added par example in the form of milk proteins or blood plasma if the coherence of the used meat is insufficient. Finally, sufficient quantities of water or ice can be added depending upon the specific meat product to help as a solvent in the emulsification.

The lean meat generally employed in major amounts may range from about 55%–80% by weight based on the final product, while the milk employed in minor amounts may range form 13%–40% by weight based on the final product.

The process according to the invention is also useful in producing low-sodium dietetic sausage that can be used as dietetic meat products for the sick. The products prepared according to the process of the invention are equally useful in the feeding of small children and it is possible to produce sausages free of nitrite salt that have nevertheless a clear and wholesome appearance, unlike that of other known low-fat, dietetic sausages.

Analysis data for parisian ham sausages and fried sausages prepared according to the present process show a considerably lower fat content and at the same time a higher protein content is compared with conventional sausages:

|  | Ham sausages according to the invention | Conventional parisian ham sausages | Fried sausage according to the invention | Conventional fried sausage |
| --- | --- | --- | --- | --- |
| fat | 3,4% | 16,45% | 5,1% | 27,52% |
| protein | 20,4% | 18,10% | 13,3% | 10,44% |
| water | 74,4% | 63,5% | 78,0% | 58,67% |
| ashes | 2,61% | 1,8% | 2,2% | 2,8% |

The above data shows, that the usual meat-milk sausage is not suitable for people requiring a low-fat and readily digestible diet.

Sausage prepared from pork meat (Lyons ham sausages) according to the present process also provides considerably reduced fat content, a better consistency and a better taste:

|  | Lyons ham sausage according to the invention | Conventional lyons ham sausage |
| --- | --- | --- |
| water | 68,7% | 58,7% |
| ashes | 1,9% | 2,2% |
| fat | 13,8% | 27,5% |
| proteins | 13,4% | 10,44% |
| Na/100 | 536 mg | 777 mg |
| K/100 g | 218 mg | 216 mg |
| N | 2,14% | 1,67% |

Such pork sausage produced according to the invention has only half of the fat content of conventional sausage and a considerably reduced content of sodium.

The intensity of taste and flavor of the meat product of this invention is increased by the high content of minerals and salt in whole milk (Ca/P). In this manner the addition of sodium chloride (NaCl) can be considerably reduced without a lessening of taste and flavour. The sodium content in a liver sausage is for example reduced to about 575 mg/100 g when prepared in accordance with this invention as compared to about 825 mg/100 g in a conventional liver sausage.

The novel food product according to the invention and the process for its preparation represents a significant advance in the preparation of food in view of the processing of meat with natural milk.

In the following examples, there is set forth details of the invention, however, without limiting the invention to these examples:

EXAMPLE 1

Preparation of fried sausage 10,000 g of lean meat were pre-comminuted in the mincing machine and then finally comminuted in the cutter, while adding 80 g of phosphate and 200 g of table salt. In this composition 6,000 g of frozen skimmed milk was emulsified in the cutter. There was likewise blended in the cutter 80 g of seasoning for fried sausages and 20 g of glutamate. This final emulsion was filled into small chords sausage casings having a 18/20 diameter and boiled at 65° C. for 20 minutes. The sausages were then cooled in cold water.

EXAMPLE 2

Preparation of fried sausage 10,000 g of lean meat were pre-comminuted in the mincing machine and then finally comminuted in the cutter while adding 30 g of phosphate and 200 g of table salt. This composition was then emulsified in the cutter with 6,000 g frozen skimmed milk and blended with 120 g of dietetic veal sausage seasoning. This final emulsion was filled into small chords sausage casings having a 18/20 diameter and boiled at 65° C. for 20 minutes. The cooling was in cold water.

EXAMPLE 3

Preparation of white "Meat-cheese"

10,000 g beef meat or other lean meat were comminuted in the cutter while adding 200 g of table salt and 80 g of phosphate. After adding 6,000 g frozen skimmed milk or milk the mixture was finely comminuted. With this emulsion there was blended 120 g of dietetic veal sausage seasoning of 80 g of fried sausage seasoning and 30 g of glutamate. The filling was in open metal containers. The frieing was carried out at 100° C. for 90 to 120 minutes according to the diameter of the container.

EXAMPLE 4

Preparation of lyons ham sausage 5,000 g of lean beef meat, 5,000 g of lean pork meat with 200 g of nitrite pickling salt and 30 g of phosphate were cut and finely cut with 5,000 g of frozen skimmed milk or whole milk. Then 120 g of dietetic seasoning for ham sausages were added and cut as finely as possible. After filling the product in skins, it would be smoked if desired. The refining step took place at 70° C. to a maximum of 72° C.

EXAMPLE 5

Preparation of ham sausage

In 5,000 of emulsion of a final emulsion prepared like in example 4, there was intermingled 5,000 g of lean pork, meat, but in cubes and previously pickled with 75 g of nitrite pickling salt and 80 g of dietetic seasoning for meat dishes together with 100 g shelled pistachio nuts. The filling was into synthetic casings having a 75/90 diameter. The refining step was carried out at 70°–72° C.

EXAMPLE 6

Preparation of Bavarian "Milzwurst" of liver grill morsels 5,000 g of beef meat and 5,000 g of lean pork meat were cut while adding 160 g of table salt and 30 g of phosphate. The mixture was finely cut together with 5,000 g of frozen milk. This was followed by mingling 80 g quick steack seasoning or fried sausage seasoning and 30 g of glutamate, 100 g of chopped parsley and 200 g of chopped onions. To this final emulsion in the cutter there is added, 3,000 g of fresh liver comminuted to obtain a grain size of 8–2 mm. The mixture was filled into a "Budenhein" grill pastry skin or other sterilized skins having a diameter of 90. It was refined at 70°–72° C. After cooking, slices about 1 cm. thick can be grilled, fried or breaded and baked.

EXAMPLE 7

Preparation of cooked liver sausage 1,500 g of liver were finely comminuted in the cutter while adding 30 g of pickling salt. Then 1,500 g of boiled and pickled lean pork meat were also finely comminuated in the cutter and mixed and homogenized with 750 g milk and 300 g of boiled onions. To this composition there was added the liver likewise pre-comminuted in the cutter together with 500 g of cooking broth, 100 g of flavor enhancers, 30 g of seasoning for liver sausages and 30 g of a reddening agent as ascorbic acid. The whole mixture was thoroughly homogenized. The composition thus prepared was filled in a 45-diameter sterilized skin, refined at 75° C. for 45 minutes and then cooled in water having a temperature of about 40° C. The possible disintegration of the sausage mass is avoided by massaging.

EXAMPLE 8

Preparation of a liver pie 1,000 g of liver were finely comminuted in the cutter while adding 20 g of pickling salt and 20 g of raw onions. To this composition were added 1,500 g of final emulsion as obtained in the preparation according to example 4—and this mixture was homogenized in the cutter while adding 10 g of glutamate, 10 g of pastry seasoning and 10 g of reddening agent. The curds are contained in the final emulsion. The final composition is refined in a 90-diameter metal container for three hours at a water temperature of 70° C.

EXAMPLE 9

Preparation of a boiled meat sausage 5,000 g of lean beef meat of young animals was pre-comminuated in a mincing machine and comminuted and homogenized in the cutter while adding 2500 g of skimmed milk, 100 g of nitrile pickling salt and 30 g of phosphate. Cutting until the best possible emulsification was obtained. Then there was added 50 g of seasoning for cold meats with 10 g of reddening agent and mingled in the cutter. This final emulsion was filled in a metal container or a 90-diameter synthetic skin and refined for three hours at 65° C.

EXAMPLE 10

Preparation of "Parisian ham sausage"

5,00 g of ox meat or other beef meat of the high quality was pre-comminuted in the mincing machine. It was further comminuted in the cutter while adding 100 g of pickling salt, 75 g of phosphate and homogenizing and emulsyfying with 2500 g skimmed milk. Than 10 g of glutamate and 80 g of seasoning for cold meat were mingled with that composition. To this final emulsion there was added in a blending machine or by hand, 2,000 g of strips of cut lean meat of young beef, pork or veal, 100 g of chopped onions and 30 g of chopped parsley. This raw composition was filled into a 90-diameter metal container and refined for three hours at 70° C.

EXAMPLE 11

Preparation of a liver pie 3,000 g of liver were finely comminuted in the cutter while adding 60 g of pickled salt. 3,000 g of pickled and boiled lean meat were then also finely comminuted in the cutter and homogenized with 3000 g skimmed milk, and 600 g of boiled onions. This composition was homogenized in the cutter with the prepared liver, 1,200 g of cooking broth, 100 g of glutamate, 60 g of seasoning for liver sausages and 60 g of reddening agent. This final composition was refined in the agitator vessel for 45 minutes at 75° C., then again homogenized in the cutter and filled into tubes or other stable sterilized containers.

EXAMPLE 12

Preparation of a breakfast meat 5,000 g of meat without fatty tissue was pre-comminuted in the mincing machine, then comminuted and homogenized in the cutter while adding 100 g water, 100 g of nitrite pickling salt and 30 g of phosphate. To this basic emulsion were added 2300 g skimmed milk and this mass was homogenized as thoroughly as possible. Then 30 g of mixed seasoning for breakfast meat were added and 1,500 g of lean meat were additionally blended in the cutter until the mass was comminuted to the size of a grain of rice. The final mass was filled into cans and refined at a core temperature of 95° C.

EXAMPLE 13

Preparation of a liver and curds dish 3,000 g of raw liver and 600 g of boiled onions were minced and cut while adding 60 g of pickling salt, 8,000 g of pickled and boiled lean meat which was likewise comminuted in the mincing machine and cutter. Finally 3000 g skimmed milk were processed in the cutter with 40 g of melted salt. The thus prepared liver, the meat, 1,000 g of cooking broth, 100 g of glutamate, 60 g of seasoning for liver sausage and 50 g of reddening agent were then successively added and homogenized in a cutter. This mass was then heated in the agitator vessel for 45 minuted at 72° C. and filled into sterlized skins.

EXAMPLE 14

Preparation of a meat and curds dish in the form of meat sausages 5,000 g of beef meat were pre-comminuted in the mincing machine and cut while adding 100 g water, 100 g of nitrite pickling salt and 25 g of phosphate. 2500 g whole milk were mixed in a cutter, with 40 g of melted salt and the meat-salt mixture was added and homogenized. To this composition were added 40 g seasoning for meat sausages, 20 g glutamate and 10 g reddening agent. It was filled in 100-diameter metal containers and refined for 3 hours at 70° C.

EXAMPLE 15

Preparation of a Fine meat sausage 3,000 g of muscle flesh of beef were processed in the cutter to form a basic emulsion while adding 75 g of pickling salt, 22,5 g of phosphate and 600 g of ice. Then 300 g of dissolved milk protein were blended in the cutter in 1,200 g of water. To that composition were added 1200 g milk and cut until obtaining complete emulsion. This emulsion comprising natural milk and milk protein was then homogenized in the cutter with the prepared basic emulsion. This composition obtained was seasoned in the manner of a fine meat sausage and refined in a metal container at a water temperature of 65° C.

EXAMPLE 16

Preparation of a cooked sausage 1,200 g of milk (or 1,000 g of curds) are first emulsified in the cutter with 300 g of disintegrated milk protein and 1,200 og of water. The 1,500 g of liver were finely comminuted in the cutter while adding 66 g of pickling salt. 1,000 g of boiled lean meat were also comminuted in the cutter and successively blended with the above prepared emulsion and the homogenized liver. This mass was seasoned in the manner of a liver pie and refined in a cellophane skin at a water temperature of 65° C.

The present invention as discussed above is directed to the production of low-calorie and low-fat meat products. While the above description and Examples have been in part specific, they are not meant to be limiting. As such, the invention is, of course, subject to numerous variations and modifications, all of which are obvious to those skilled in the art. Having thus described their invention, applicants wish only to be limited by their claims as follows.

We claim:

1. A process for preparing meat products comprising thoroughly admixing a mixture consisting of 13 to 40 weight percent of frozen skimmed milk or frozen whole milk and from 55 to 80% by weight of lean meat selected from the group consisting of beef, veal, pork and hare in the absence of any emulsifier and in the presence of less than 5% by weight of seasonings and/or preservatives and then heating said mixture in a container at from 65° to 100° C. for at least 20 minutes.

2. The process of claim 1 wherein seasoning and/or preservatives are selected from the group consisting of nitrites, pickling salt, phosphates, table salt, glutamates, parsley, onions and pistachio nuts.

* * * * *